United States Patent
Pradeep et al.

(10) Patent No.: US 9,595,065 B2
(45) Date of Patent: Mar. 14, 2017

(54) TRANSACTION ASSISTANCE

(71) Applicant: NCR Corporation, Duluth, GA (US)

(72) Inventors: Mandapati Venkata Pradeep, Andhra Pradesh (IN); Marreddy Thumma, Hyderabad (IN)

(73) Assignee: NCR Corporation, Duluth, GA (US)

( * ) Notice: Subject to any disclaimer, the term of this patent is extended or adjusted under 35 U.S.C. 154(b) by 1 day.

(21) Appl. No.: 14/484,963

(22) Filed: Sep. 12, 2014

(65) Prior Publication Data

US 2016/0078528 A1    Mar. 17, 2016

(51) Int. Cl.
| | |
|---|---|
| G06Q 40/00 | (2012.01) |
| G06Q 40/02 | (2012.01) |
| G07F 19/00 | (2006.01) |
| G06Q 20/18 | (2012.01) |
| G06Q 20/10 | (2012.01) |
| G06Q 30/00 | (2012.01) |

(52) U.S. Cl.
CPC ............ *G06Q 40/02* (2013.01); *G06Q 20/10* (2013.01); *G06Q 20/18* (2013.01); *G06Q 30/016* (2013.01); *G07F 19/206* (2013.01); *G07F 19/209* (2013.01)

(58) Field of Classification Search
CPC ........ G06Q 40/02; G06Q 20/10; G06Q 20/18; G06Q 30/106
See application file for complete search history.

(56) References Cited

U.S. PATENT DOCUMENTS

| | | | |
|---|---|---|---|
| 7,814,016 B2 | 10/2010 | Pranger | |
| 2007/0045397 A1 | 3/2007 | Ireland et al. | |
| 2008/0093441 A1* | 4/2008 | Taylor | G07F 19/20 235/379 |
| 2013/0016173 A1* | 1/2013 | Johnson | G06Q 20/18 348/14.03 |

FOREIGN PATENT DOCUMENTS

| | | |
|---|---|---|
| WO | 98/24040 | 6/1998 |
| WO | 99/30263 | 6/1999 |
| WO | 2013/102654 | 7/2013 |

OTHER PUBLICATIONS

European Search Report issued in co-pending European patent application EP15181826.7 issued Jan. 5, 2016.

\* cited by examiner

*Primary Examiner* — Thien M Le
*Assistant Examiner* — Asifa Habib
(74) *Attorney, Agent, or Firm* — Schwegman, Lundberg & Woessner

(57) ABSTRACT

A transaction at a Self-Service Terminal (SST) is initiated as a first type by a customer. During the transaction, the transaction can dynamically switch to one or more second types in order to provide transaction assistance to the customer during the transaction.

18 Claims, 4 Drawing Sheets

TRANSACTION ASSISTANCE

BACKGROUND

More and more customers of enterprises are embracing and using automated Self-Service Terminals (SSTs) to conduct transactions with those enterprises. For example, in the banking industry Automated Teller Machines (ATMs) can now almost entirely complete any transaction a customer is in need of without a teller's physical presence being required.

Moreover, ATMs situated in a bank branch can offer customers real-time assistance while the customers are transacting at the ATMs. The assistance can come in the form of a teller present at the bank branch or can come through remote video link to a remote teller.

However, customers do not like to wait when they need assistance and expect to be treated expeditiously by their banks. So, when a customer wants assistance from a teller and has to wait until one becomes available, the customer may become increasingly displeased with his/her bank the longer the wait grows.

For example, suppose a customer requests assistance of a local teller at a bank branch from an ATM but all local tellers are busy servicing other customers. Conversely, suppose a customer requests assistance of a remote teller from an ATM via a video link but all available remote tellers are busy servicing other customers.

In still another situation, suppose a customer initiates a transaction at the ATM but has no idea that the transaction requires a local or remote teller to inspect the transaction and either authorize the transaction or seek an override for the transaction to proceed. In this situation, the customer may not even realize that assistance is needed and may only receive a message back from the core banking system that the transaction was denied, which means the customer then has to go to a local teller queue at the bank branch and ask why the transaction failed.

Typically, tellers may have limited information regarding the transactions customers are performing at the ATMs within the bank branch, such that a failed transaction needs to be reinitiated and started over on failure. This is time consuming for both the customers and the tellers (local or remote).

SUMMARY

In various embodiments, methods and a Self-Service Terminal (SST) for providing transaction assistance are presented.

According to an embodiment, a method for providing transaction assistance is presented. Specifically, a customer initiated transaction of a first type is identified by an SST. Next, the transaction is dynamically switched to a second type during the transaction at the SST.

DETAILED DESCRIPTION

Figure 1:
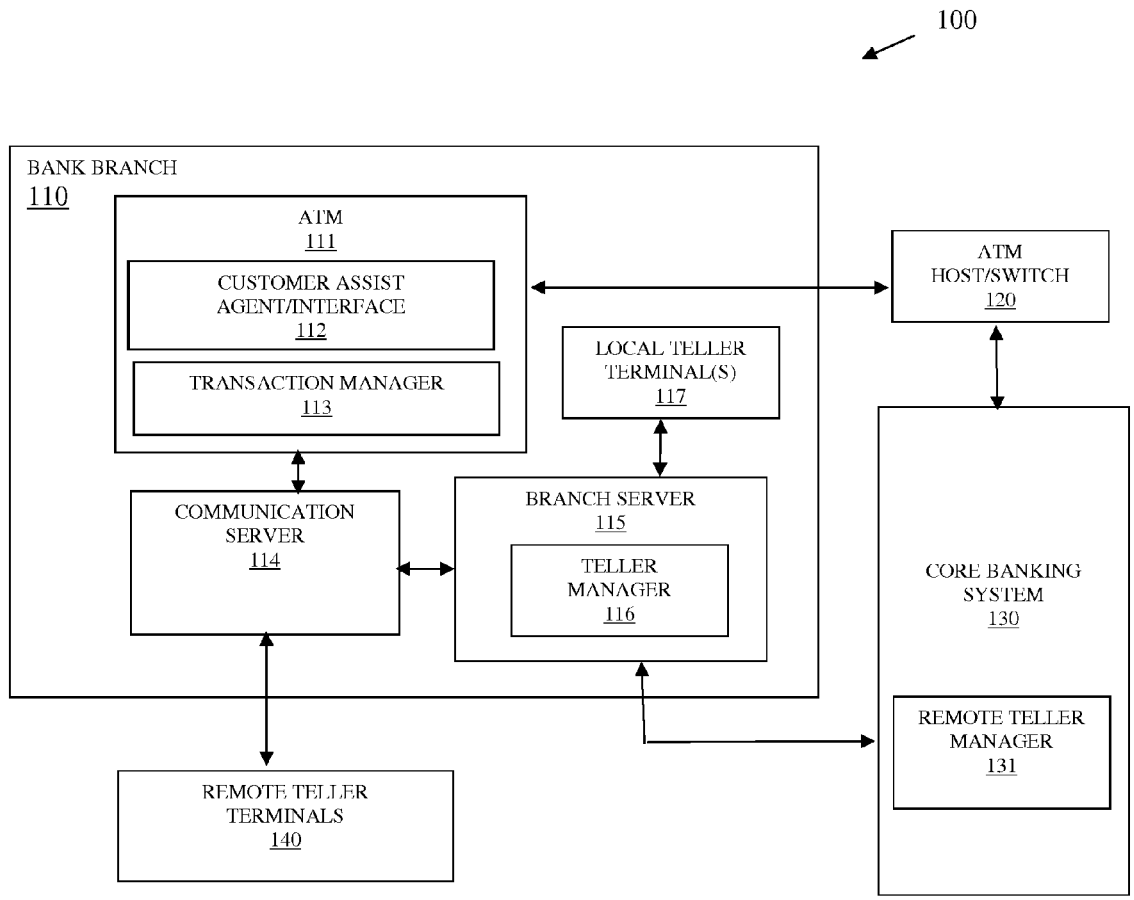
FIG. 1 is a diagram of a banking retail system providing transaction assistance for Automated Teller Machine (ATM) transactions, according to an example embodiment.

FIG. 1 is a diagram of a banking retail system 100 providing transaction assistance for Automated Teller Machine (ATM) transactions, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of Self-Service Terminal (SST) transaction assistance, presented herein and below.

The banking retail system 100 includes a bank branch 110, an ATM host/switch 120, a core banking system 130, and one or more remote teller terminals 140. The bank branch 110 includes an ATM 111 (having a customer assist agent/interface 112 and a transaction manager 113), a communication server 114, a branch server 115 (having a teller manager 116), and one or more local teller terminals 117. The core banking system 130 includes a remote teller manager 131.

During operation, a customer operating the ATM 111 to conduct a transaction may request assistance before, during, or after the customer's ATM transaction using the customer assist agent/interface 112. Any financial transactions to deposit or receive cash from the ATM 111 make a network connection with a remote ATM host/switch 120 that routes transaction details along with approval or denial through the core banking system 130.

Local assistance from a local teller can be achieved by direct customer request or by teller unsolicited offers for assistance. Such local assistance connects from the ATM 111 through the communication server 114 to the branch server 115 (using the teller manager 116) and then to a local teller terminal 117 operated by a local teller.

The branch server 114 interacts through a network connection with the core banking system 130.

When the customer requests remote assistance through the customer assist agent/interface 112 while operating the ATM 111, the request for remote assistance is routed through the communication server 114 to the branch server 115. The branch server 114 (using the teller manager 116) connects to the core banking system 130 with the request for remote assistance. The request for remote assistance is processed within the core banking system 130 by the remote teller manager 131 for availability of a particular remote teller to assist the customer at the ATM 111 from a remote teller terminal 140 operated by the particular remote teller.

Suppose, the customer operating the ATM 111 uses the customer assist agent/interface 112 to request a local teller available at the bank branch but no local teller is presently available to assist the customer. In such a situation, the teller manager 116 maintains the availability (status) of local tellers at the bank branch 110 and also maintains the availability of remote tellers through interactions with the remote teller manager 131 of the core banking system 130.

In such a situation, the teller manager 116 can dynamically determine that the customer is going to have to wait to receive local teller assistance but based on the status (availability) of remote tellers, as resolved through the remote teller manager 131, the customer can presently receive remote teller assistance via a video link at the ATM 111.

Here, the teller manager 116 communicates back to the customer assist agent interface 112 (through the communication server 114) that there is presently a wait or delay for a local teller but there is no wait or delay for a remote teller. The customer assist agent/interface 112 communicates this message by rendering a screen on a display of the ATM 111 having one or more selectable options that the customer can make, such as: "I want to wait for a local teller to become available," "I want to connect immediately to the available remote teller," or "I want to cancel my request for assistance." If the customer selects the option associated with "I want to connect immediately to the available remote teller," then the customer assist agent interface 112 communicates the connection request to the available remote teller to the communication server 114 and a video link connection is made between the customer operation the ATM 111 and the available remote teller operating one of the remote teller terminals 140.

In an embodiment, if the customer selects the option associated with "I want to wait for a local teller to become available," then the customer assist agent interface 112 may present within the screen on the display of the ATM 111 an estimated wait time to expect for a local teller to become available and allow the customer to change the wait selection or continue to wait. The estimated wait times may be provided by the teller manager 116 based on what actions and queue lengths each of the local tellers are performing and experiencing. The customer assist agent interface 112 may also use historical metrics associated with particular tellers, particular actions, and particular queue lengths to produce the estimated wait times.

Similarly, if the customer operating the ATM 111 selects a request for a remote teller's assistance, then the customer assist agent interface 112 communicates with the teller manager 116 through the communication server 114. The teller manager 116 contacts the remote teller manager 131 of the core banking system 130 and determines whether a remote teller is presently available. When a remote teller is available the teller manager 116 communicates to the communication server 114 and that remote teller operating his/her remote teller terminal 140 is connected via video link to the customer operating the ATM 111.

However, when a remote teller is unavailable but a local teller is available (as determined by the teller manager 116); this situation is communicated back to the customer assist agent interface 112. The customer assist agent interface 112 renders screen on a display of the ATM 111 offering the customer options, such as "I want to wait for remote teller to become available," "I want to connect immediately to a local teller," or "I want to cancel the request for assistance."

When the customer selects the "I want to connect immediately to a local teller," the customer assist agent interface 112 communicates that customer selection to the teller manager 116 through the communication server 114 and a local teller operating his/her local teller terminal 117 is connected to the customer operating the ATM 111.

In an embodiment, the remote teller manager 131 may also provide an estimated wait time for a remote teller based on actions, queues, and/or historical metrics for particular remote tellers, particular actions, and/or particular remote teller queue lengths. The estimated wait time communicated to the teller manager 116 and back to the customer assist agent interface 112 where the customer assist agent interface 112 renders the estimated wait time to the screen of the display associated with the ATM 111 along with options for the customer to change a selection to a local teller or continue to wait for the next available remote teller.

The customer is given a fallback mechanism for the customer's preferred method of teller assistance and the customer maintains control on how to proceed or whether to proceed at all with teller assistance while operating the ATM 111. Moreover, the customer can switch between remote and local teller assistance when the customer desires to do so, based on estimated wait times or delays for the customer's originally desired form of assistance (remote or local). This control provides a feeling of satisfaction that customer's needs are being satisfactorily addressed by the bank branch 110 and a satisfied customer is a repeat and loyal customer for the bank branch 110.

The diagram 100 also provides another type of transaction assistance to the customer operating the ATM 111. This entails scenarios when the customer may not even realize that teller assistance is needed. For example, the customer may not request any assistance at all through the customer assist agent interface 112 and may initiate a transaction with the core banking system 130 at the ATM 111 through the ATM host/switch 120.

For instance, the customer may request a withdrawal of $1000 from the ATM 111 and be unaware that bank branch rules only permit cash withdrawals of $500 or less unless the identity of the customer can be independent confirmed by a local or remote teller.

Typically, a conventional ATM includes two modes of operation within a conventional bank branch. An information mode and an authorization mode but a conventional ATM cannot switch dynamically between the two modes. That is, once a mode of operation is established it remains for the customer's transaction at the conventional ATM. This situation is enhanced herein, such that once a mode of operation is established it can be dynamically switched to a different mode of operation to complete the customer's transaction at the ATM 111.

During an information mode of operation, a local or remote teller can view transaction information for a transaction between the ATM 111 and the ATM host/switch 120. This is achieved by the transaction manager 112 pushing the transaction information to the branch server 115 through the communication server 114. The branch server 115 then provides the transaction information to the teller terminals 117 for monitoring the ongoing ATM transaction of the customer operating the ATM 111. However, in this mode, the tellers cannot approve or override transaction details or core banking system denials of the transaction; instead the tellers merely view the transaction details.

During an authorization mode of operation for the ATM 111, the transaction (including encrypted PIN) of the customer making the transaction is routed through the communication server 114 and branch server 115 to one of the tellers (local or remote). If the teller approves of the transaction, it is routed to the core banking system 130 for authorization. If the core banking system 130 still denies the transaction, the teller may be able to still override that denial. In this mode the ATM 111 does not communicate with the ATM host/switch 120.

The transaction manager 113 of the ATM 111 monitors a transaction entered by a customer and captures the encrypted PIN for that transaction. Bank rules are available to the transaction manager 113 through the branch server 115. The transaction manager 113 makes a determination as to whether bank rules are going to deny the transaction and if this is the case, the entire transaction is routed in an authorization mode.

So, using the previously used example when the customer requests a withdrawal of $1000, the transaction manager 113 determined (through evaluation of the bank rules) that the core banking system 130 is going to deny the transaction. So, the transaction manager 113 reroutes the transaction to the branch server 115 where it is sent to a local teller or a remote teller. The customer assist agent interface 112 is then engaged with a connection at the ATM 111 with the local or remote teller via a local teller terminal 117 or a remote teller terminal 140 where according to bank rules and procedures the teller independently verifies the identity of the customer, such as via a video or a local teller approaching the customer for verification. The customer may then be required to produce identification or perhaps a photo on file is sufficient for identity validation (according to bank rules). The teller then adds the verification to the transaction and the transaction is routed to the core banking system 130 for approval. Should a denial still return, if policy permits the teller can override the denial and authorize the transaction at the ATM 111.

In another case, the customer performs an initial transaction directly with the core banking system 130 through the ATM host/switch 120, such that the ATM 111 is operating in an information mode. The transaction manager 113 captures the initial encrypted PIN and transaction details at the ATM 111, when the core banking system 130 denies the transaction, the transaction manager 113 traps the denial before the customer is presented the denial and reroutes the entire transaction with encrypted PIN through the branch server 115 to place the ATM 111 in an authorization mode of operation. The transaction is then augmented by the teller (remote or local) and sent to the core banking system 130 for authorization. Again, should a denial come back and if policy permits, the teller can still override the denial and permit the transaction.

So, the transaction manager 113 can be used to decide when the transaction at the ATM 111 should be placed in authorization mode before the transaction directly communicates with the ATM host/switch 120 or the transaction manager 113 can dynamically switch the ATM from an information mode of operation (where it directly connected to the ATM host/switch 120 for the transaction) to an authorization mode of operation without the customer being aware of the teller assistance being used in the authorization mode of operation.

It may also be that custom interaction is not even required such that the customer is unaware completely of the teller assistance during a dynamically switched mode of operation from information mode to authorization mode. For example, in the continuing example, the local or remote teller may access a camera of the ATM 111 to visually inspect the customer without the customer being aware of this inspection. A photo on file or facial recognition software may be used to confirm the identity of the customer thereby permitting the teller to augment the transaction with the identity verification and send to the core banking system 130 for reprocessing.

Therefore, the ATM 111 mode of operation can start out or begin in information mode and initially rerouted within the bank branch 110 in an authorization mode, or the ATM 111 mode of operation can receive a denial from the core banking system 130 and be rerouted and reprocessed in an authorization mode within the bank branch 110 with or without customer knowledge of the reprocessing. In either case, the ATM's mode of operation is dynamically switched for a transaction, which heretofore has not been possible.

The diagram 100 and the ATM 111 combined with the customer assist agent/interface 112 and the transaction manager 113 identify three types of transactions: a customer request for local teller assistance, a customer request for remote teller assistance, and a customer initiated transaction made directly to the core banking system 130 through the ATM host/switch 120. The customer initiated transaction can include two modes of operation for the ATM 111, an information mode and an authorization mode. A customer can switch between the transaction types during the same transaction and within the customer initiated transaction type switching can occur dynamically from the information mode to the authorization mode as discussed in detail above.

In an embodiment, at least one local teller terminal 117 is a tablet.

In an embodiment, at least one local teller terminal 117 is a laptop.

In an embodiment, at least one local teller terminal 117 is a smart phone.

In an embodiment, at least one local teller terminal 117 is a wearable processing device.

In an embodiment, at least one local teller terminal 117 is a desktop computer terminal.

In an embodiment, each remote teller terminal 140 can be one of: a desktop computer, a laptop computer, a tablet, a smartphone, and a wearable processing device.

Some of embodiments of the FIG. 1 and other embodiments are now discussed with reference to the FIGS. 2-4.

Figure 2:
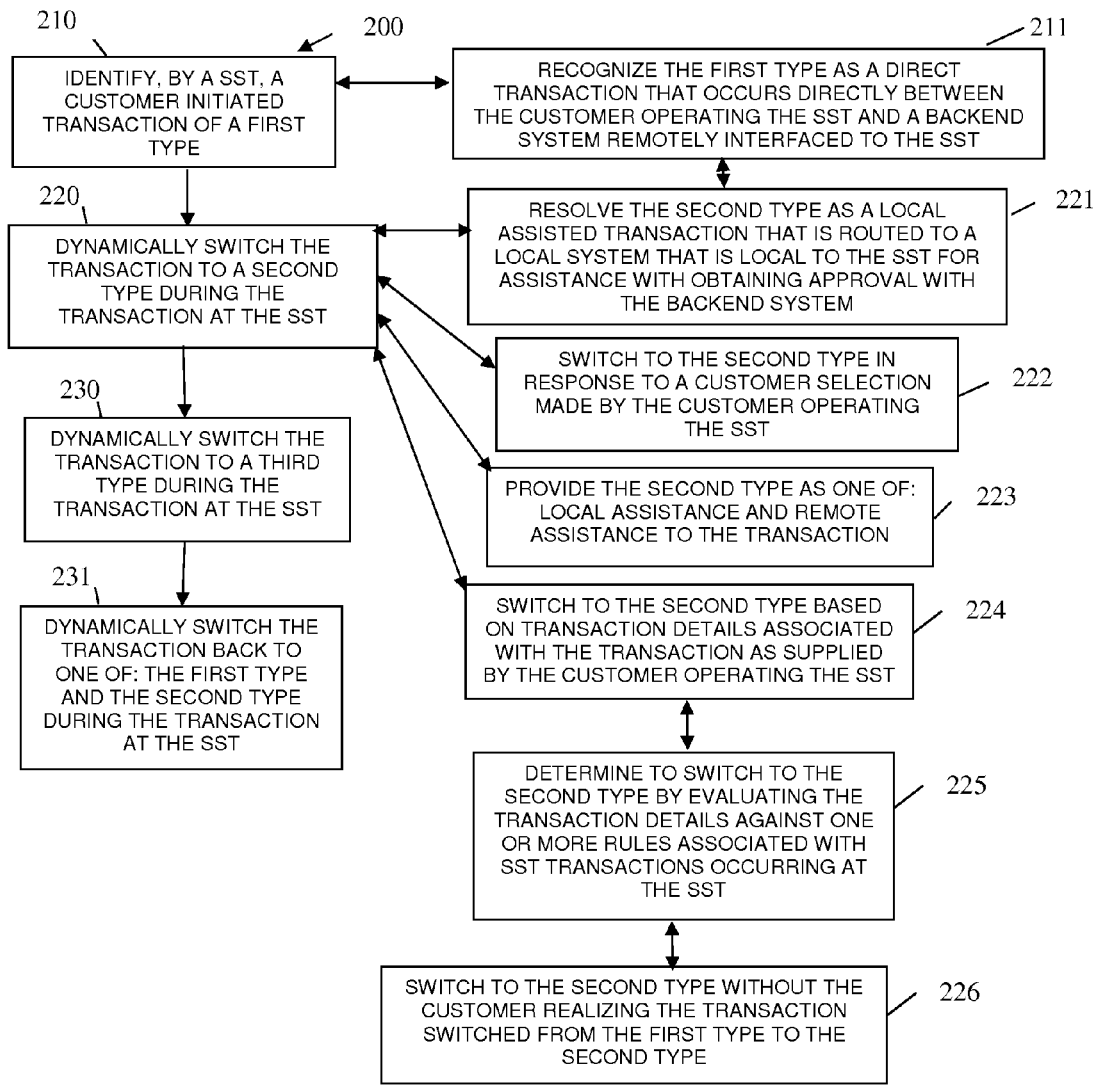
FIG. 2 is a diagram of a method for providing transaction assistance, according to an example embodiment.

FIG. 2 is a diagram of a method 200 for providing transaction assistance, according to an example embodiment. The software module(s) that implements the method 200 is referred to as a "transaction controller." The transaction controller is implemented as executable instructions programmed and residing within memory and/or a non-transitory computer-readable (processor-readable) storage medium and executed by one or more processors of a Self-Service Terminal (SST). The processor(s) of the SST that executes the transaction controller are specifically configured and programmed to process the transaction controller. The transaction controller has access to one or more network connections during its processing. The network connections can be wired, wireless, or a combination of wired and wireless.

In an embodiment, the SST that executes the transaction controller is the ATM 1111 of the FIG. 1.

In an embodiment, the SST that executes the transaction controller is a kiosk.

In an embodiment, the SST that executes the transaction controller is a Self-Service Checkout Station.

In an embodiment, the transaction controller is the transaction manager 113 of the FIG. 1.

In an embodiment, the transaction controller is a combination of the customer assist agent/interface 112 and the transaction manager 113 of the FIG. 1.

At 210, the transaction controller identifies a customer initiated transaction of a first type. Again, the types of transactions can include a customer request for local clerk assistance at the SST, a customer request for remote clerk assistance at the SST, and a customer initiated transaction to a backend system that is remote to the SST (such as directed through the ATM host/switch 120 to the core banking system 130).

In an embodiment, the customer initiated transaction can be viewed as two individual transaction types (which were described as modes above with the discussion of the FIG. 1) an information mode type and an authorization mode type (corresponding to the information mode of operation for the ATM 111 and authorization mode of operation for the ATM 111 in the discussion of the FIG. 1).

According to an embodiment, at 211, the transaction controller recognizes the first type as a direct transaction that occurs directly between the customer operating the SST and a backend system remotely interfaced to the SST. This scenario was discussed as the initial information mode of operation for the ATM 111 in the FIG. 1.

At 220, the transaction controller dynamically switches the transaction to a second type during the transaction at the SST. This can be customer driven or can be automatically driven based on transaction details associated with the transaction or authorization confirmation from a backend system associated with authorizing the transaction for the customer.

In an embodiment of 211 and 220, at 221, the transaction controller resolves the second type as a local assisted transaction that is routed to a local system that is local to the SST for assistance with obtaining approval with the backend system for the transaction. This scenario was discussed above with the FIG. 1 for dynamically and automatically switching between an information mode of operation for the ATM 111 to an authorization mode of operation for the ATM 111.

In an embodiment, at 222, the transaction controller switches to the second type in response to a customer selection made by the customer operating the SST. For example, a customer initially selecting local clerk assistance is now requesting or accepting an offer for remote clerk assistance.

In an embodiment, at 223, the transaction controller provides the second type as one of: local assistance and remote assistance to the transaction. In an embodiment of 223, the local assistance is local clerk assistance via a clerk operated device interfaced to the SST and the remote assistance is remote clerk assistance via a clerk operated device remotely interfaced to the SST.

In an embodiment, at 224, the transaction controller switches to the second type based on transaction details associated with the transaction as supplied by the customer operating the SST.

In an embodiment of 224 and at 225, the transaction controller determines to switch to the second type by evaluating the transaction details against one or more rules associated with SST transaction occurring at the SST.

In an embodiment of 225 and at 226, the transaction controller switches to the second type without the customer realizing the transaction switched from the first type to the second type during the same transaction at the SST. For example, an agent (local or remote) can verify the identity of the customer operating the SST via a camera interfaced to the SST without the customer realizing that the agent is assisting with the transaction and that the transaction controller switched the transaction from the first type to the second type.

According to an embodiment, at 230, the transaction controller dynamically switches the transaction to a third type during the transaction at the SST.

In an embodiment of 230 and at 231, the transaction controller dynamically switches the transaction back to one of the first type and the second type during the transaction at the SST.

The transaction controller provides the ability to maintain a single transaction at an SST and switch that transaction back and forth between different types associated with that single transaction. This can be customer driven and/or automatically driven by the transaction controller, and when automatically driven the customer may or may not be cognizant of the type switching.

Figure 3:
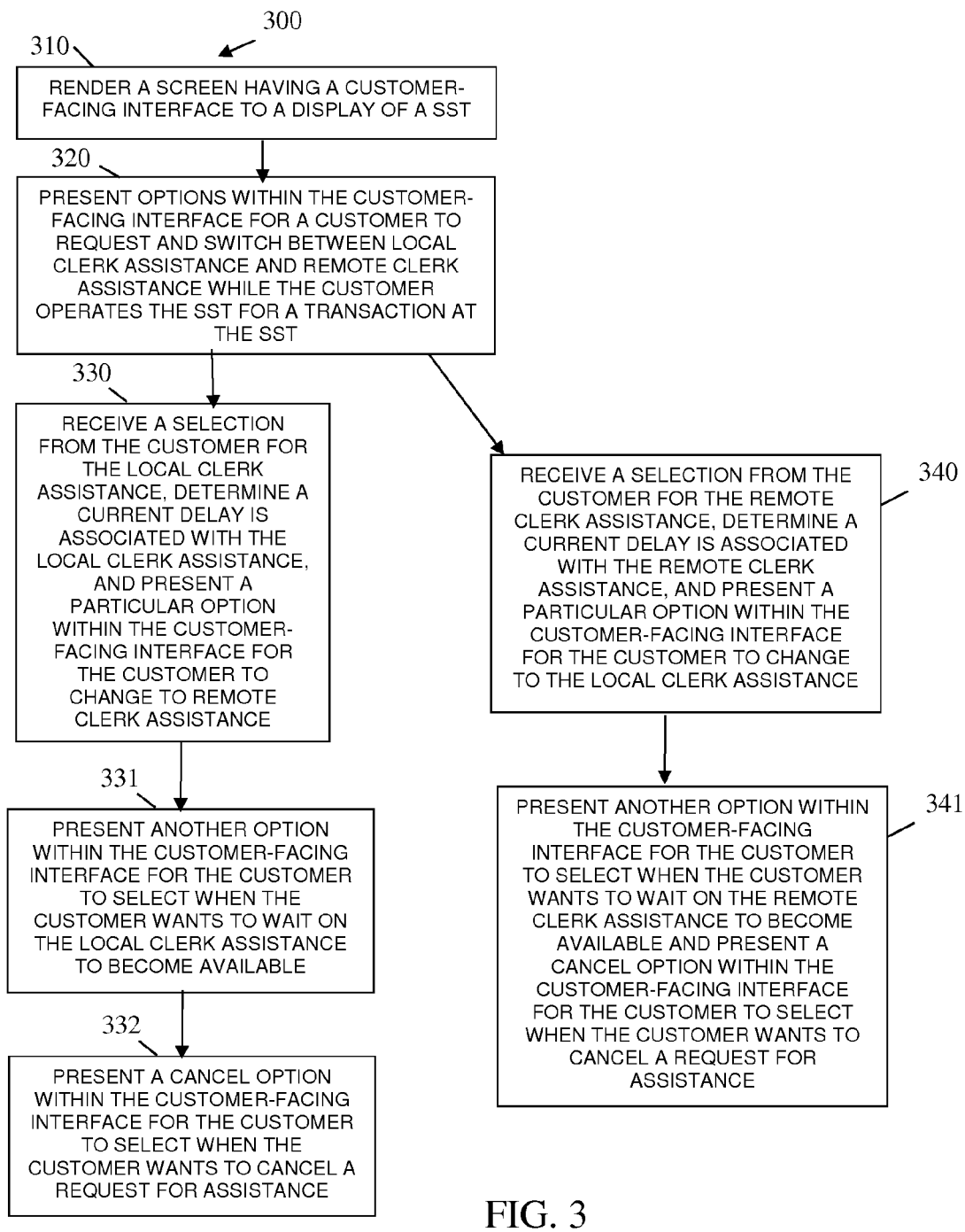
FIG. 3 is a diagram of another method for providing transaction assistance, according to an example embodiment.

FIG. 3 is a diagram of another method 300 for providing transaction assistance, according to an example embodiment. The software module(s) that implements the method 300 is referred to as a "SST assistance manager." The SST assistance manager is implemented as executable instructions programmed and residing within memory and/or a non-transitory computer-readable (processor-readable) storage medium and executed by one or more processors of a SST. The processors that execute the SST assistance manager are specifically configured and programmed to process the SST assistance manager. The SST assistance manager has access to one or more network connections during its processing. The network connections can be wired, wireless, or a combination of wired and wireless.

In an embodiment, the SST that executes the SST assistance manager is ATM 111 of the FIG. 1.

In an embodiment, the SST that executes the SST assistance manager is a kiosk.

In an embodiment, the SST that executes the SST assistance manager is a Self-Service Checkout Station.

In an embodiment, the SST assistance manager is the customer assist agent/interface 112 of the FIG. 1.

At 310, the SST assistance manager renders a screen having a customer-facing interface to a display of an SST.

At 320, the SST assistance manager presents options within the customer-facing interface for a customer to request and switch between local clerk assistance and remote clerk assistance while the customer operates the SST for a transaction at the SST. It is noted that both the local clerk assistance and remote clerk assistance is automated in a sense that a local clerk operating a clerk device interfaces to the SST to communicate with the customer via the customer-facing interface and the remote clerk operating a remote clerk device interfaces to the SST to communicate with the customer via the customer-facing interface. Local implies that the local clerk and the local clerk device are in proximity to the SST and remote implies that the remote clerk and the remote clerk device are geographically dispersed and not in proximity to the SST.

According to an embodiment, at 330, the SST assistance manager receives a selection from the customer from one of the options for the local clerk assistance. The SST assistance manager determines a current delay is associated with providing the customer with the local clerk assistance. Therefore, the SST assistance manager presents a particular option within the customer-facing interface for the customer to change to the remote clerk assistance.

In an embodiment of 330 and at 331, the SST assistance manager presents another option within the customer-facing interface for the customer to select when the customer wants to wait on the local clerk assistance to become available. The SST assistance manager may also provide an estimated wait time for this wait for the customer to make an informed decision on the whether to elect to wait on the local clerk assistance.

In an embodiment of 331 and 332, the SST assistance manager presents a cancel option within the customer-facing interface for the customer to select when the customer wants to cancel a request for assistance.

In an embodiment, at 340, the SST assistance manager receives a selection from the customer for the remote clerk assistance. The SST assistance manager determines a current delay is to be expected with the remote clerk assistance. Accordingly, the SST assistance manager presents a particular option within the customer-facing interface for the customer to change to the local clerk assistance.

In an embodiment of 340 and at 341, the SST assistance manager presents another option with the customer-facing interface for the customer to select when the customer wants to wait on the remote clerk assistance. The SST assistance manager may also provide an estimated wait time for the remote clerk assistance for the customer to make an informed decision on whether to wait on the remote clerk assistance. The SST assistance manager also presents a cancel option within the customer-facing interface for the customer to select when the customer wants to cancel a request for assistance.

The SST assistance manager provides the customer operating the SST with options on assistance and with control over what type of assistance to use when delays may be expected with the customer's preferred type of assistance during a customer initiated transaction at the SST.

Figure 4:
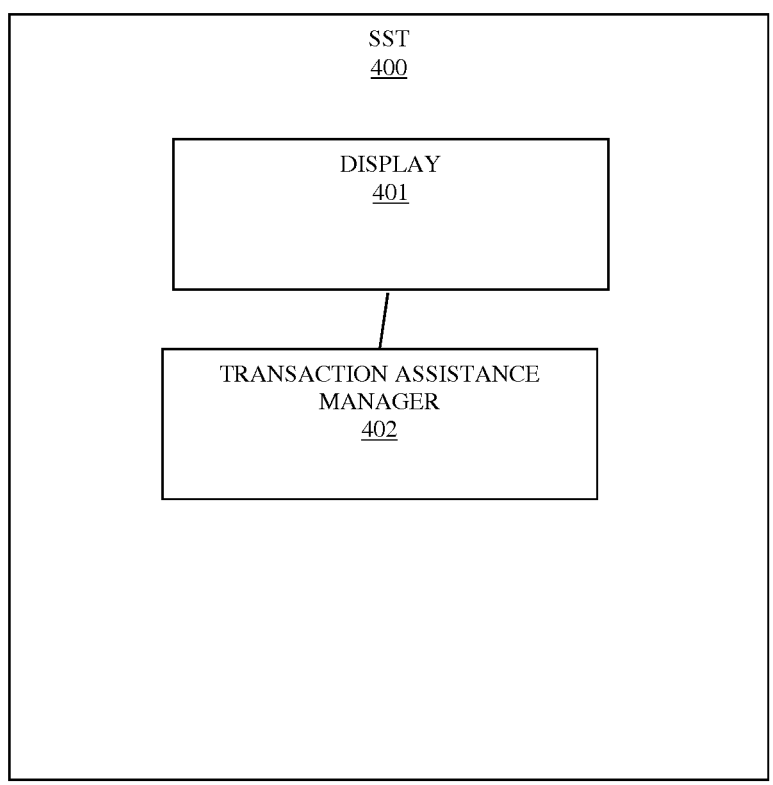
FIG. 4 is a diagram of a Self-Service Terminal (SST), according to an example embodiment.

FIG. 4 is a diagram of a SST 400, according to an example embodiment. The SST 400 includes a variety of hard ware components and software components. The software components of the SST 400 are programmed and reside within memory and/or a non-transitory computer-readable medium and execute on one or more processors of the SST 400. The SST 400 communicates one or more networks, which can be wired, wireless, or a combination of wired and wireless.

In an embodiment, the SST 400 is the ATM 111 of the FIG. 1.

In an embodiment, the SST 400 is a kiosk.

In an embodiment, the SST 400 is a Self-Service Checkout Station.

The SST 400 includes a display 401 and a transaction assistance manager 402.

In an embodiment, the display 401 is a touchscreen.

The transaction assistance manager 402 is adapted and configured to: execute on the SST 400, render a customer interface within a screen on the display 401 to present options to the customer to switch between local and remote assistance during a transaction of the customer at the SST 400.

In an embodiment, the transaction assistance manager 402 is further adapted and configured to dynamically switch the transaction from a direct transaction with a backend system remotely interfaced to the SST 400 to a rerouted local assisted transaction serviced by an agent to assist the customer in obtaining approval from the backend system for the transaction.

In an embodiment of the latter embodiment, the transaction assistance manager 402 is further adapted and configured to reroute the rerouted local assisted transaction in a manner that is transparent to the customer.

Continuing with the last embodiment, the SST 400 is an ATM, the direct transaction is an information mode of operation for the ATM, and the rerouted local assisted transaction is an authorization mode of operation for the ATM.

In an embodiment, the transaction assistance manager 402 is the transaction manager 113 of the FIG. 1.

In an embodiment, the transaction assistance manager 402 is the method 200 of the FIG. 2.

In an embodiment, the transaction assistance manager 402 is the customer assist agent/interface 112 of the FIG. 1.

In an embodiment, the transaction assistance manager 402 is the method 300 of the FIG. 3.

In an embodiment, the transaction assistance manager 402 is a combination of the customer assist agent/interface 112 and the transaction manager 113 of the FIG. 1.

In an embodiment, the transaction assistance manager 402 is a combination of the methods 200 and 300 of the FIGS. 2 and 3, respectively.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
identifying, by a Self-Service Terminal (SST), a customer initiated transaction of a first type; and
dynamically switching, by the SST, the transaction to a second type during the transaction at the SST based on evaluation of transaction details of the transaction and retaining for processing with the second type of the transaction an encrypted Personal Identification Number (PIN) supplied by the customer for the first type of transaction, and wherein when a denial for the transaction is detected for the first type on the SST, trapping, by the SST, the denial and dynamically switching to the second type without the customer being aware of the denial for the first type.

2. The method of claim 1 further comprising, dynamically switching the transaction to a third type during the transaction at the SST.

3. The method of claim 2 further comprising, dynamically switching the transaction back to one of: the first type and the second type during the transaction at the SST.

4. The method of claim 1, wherein identifying further includes recognizing the first type as a direct transaction that occurs directly between the customer operating the SST and a backend system remotely interfaced to the SST.

5. The method of claim 4, wherein dynamically switching further includes resolving the second type as a local assisted transaction that is routed to a local system that is local to the SST for assistance with obtaining approval with the backend system.

6. The method of claim 1, wherein dynamically switching further includes providing the second type as one of: local assistance and remote assistance to the transaction.

7. The method of claim 1, wherein switching further includes determining to switch to the second type by evaluating the transaction details against one or more rules associated with SST transactions occurring at the SST.

8. The method of claim 7, wherein determining further includes switching to the second type without the customer realizing the transaction switched from the first type to the second type.

9. A method, comprising:

rendering a screen having a customer-facing interface to a display of a Self-Service Terminal (SST); and presenting options within the customer-facing interface for a customer to request and switch between local clerk assistance and remote clerk assistance while the customer operates the SST for a transaction at the SST and retaining an customer-supplied encrypted Personal Identification Number (PIN) supplied for the transaction at the SST for processing with the local clerk assistance and the remote clerk assistance with the transaction, and wherein when the SST detects a denial for the transaction on the SST, trapping the denial before the customer is aware of the denial and dynamically switching to the local or remote clerk assistance.

10. The method of claim 9 further comprising, receiving a selection from the customer for the local clerk assistance, determining a current delay is associated with the local clerk assistance, and presenting a particular option within the customer-facing interface for the customer to change to remote clerk assistance.

11. The method of claim 10 further comprising, presenting another option within the customer-facing interface for the customer to select when the customer wants to wait on the local clerk assistance to become available.

12. The method of claim 11 further comprising, presenting a cancel option within the customer-facing interface for the customer to select when the customer wants to cancel a request for assistance.

13. The method of claim 10 further comprising, presenting another option within the customer-facing interface for the customer to select when the customer wants to wait on the remote clerk assistance to become available and presenting a cancel option within the customer-facing interface for the customer to select when the customer wants to cancel a request for assistance.

14. The method of claim 9 further comprising, receiving a selection from the customer for the remote clerk assistance, determining a current delay is associated with the remote clerk assistance, and presenting a particular option within the customer-facing interface for the customer to change to the local clerk assistance.

15. A Self-Service Terminal (SST), comprising:

a display; and a transaction assistance manager configured and adapted to: i) execute on the SST, ii) render a customer interface within a screen on the display to present options to a customer to switch between local and remote assistance during a transaction of the customer at the SST, and iii) retain a customer-supplied encrypted Personal Identification Number (PIN) supplied for the transaction for processing by the local and the remote assistance with the transaction, and wherein when a denial is detected for the transaction on the SST, trap the denial and dynamically switch to the local or remote assistance without the customer being aware of the denial.

16. The SST of claim 15, wherein transaction assistance manager configured and adapted to iii) dynamically switch the transaction from a direct transaction with a backend system remotely interfaced to the SST to a rerouted local assisted transaction serviced by an agent to assist the customer in obtaining approval from the backend system.

17. The SST of claim 16, wherein transaction assistance manager configured and adapted, in iii), to: reroute to the rerouted local assisted transaction in a manner that is transparent to the customer.

18. The SST of claim 17, wherein the SST is an Automated Teller Machine (ATM), the direct transaction is an information mode of operation for the ATM, and the rerouted local assisted transaction is an authorization mode of operation for the ATM.

* * * * *